No. 788,551.  
Patented May 2, 1905.

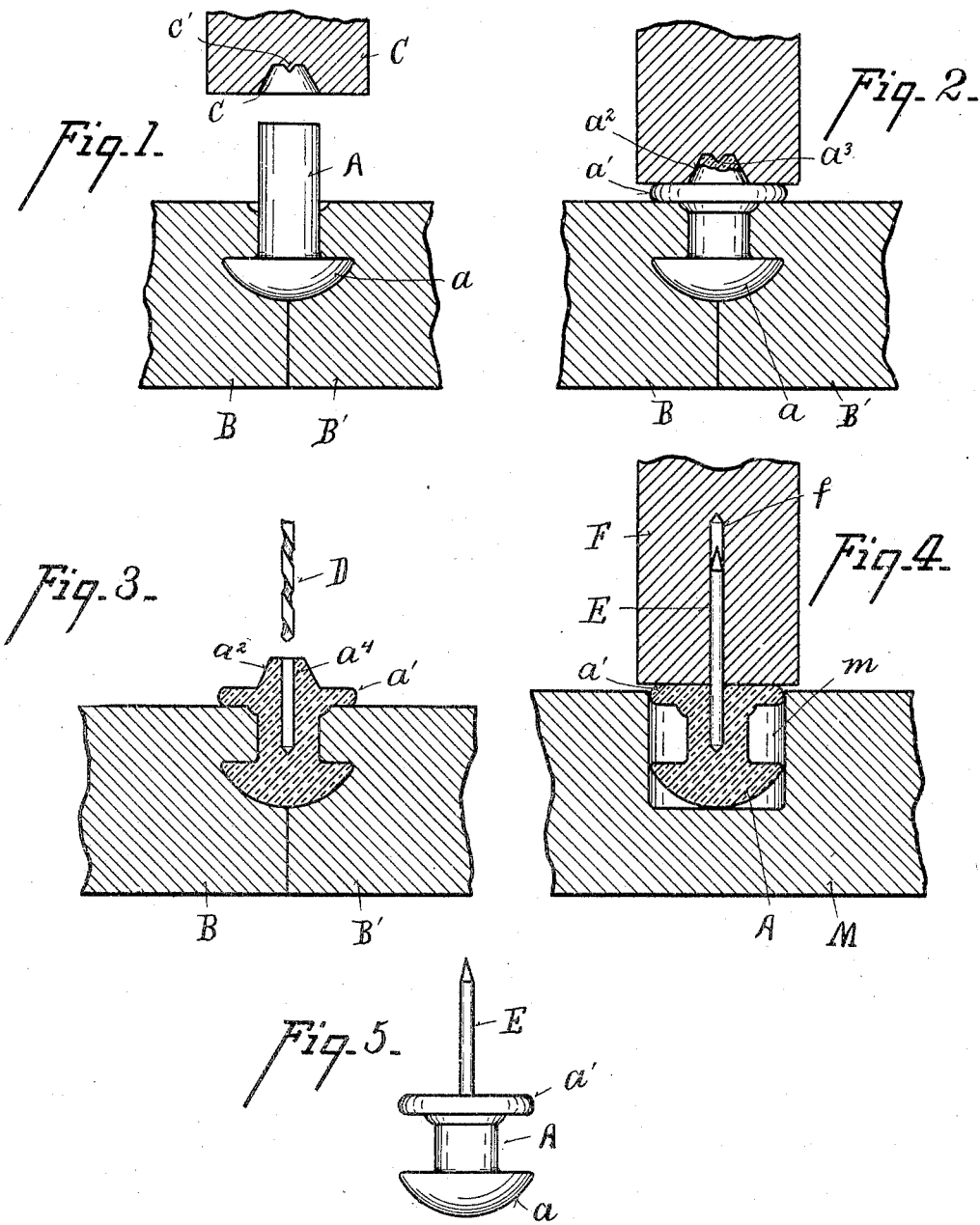

UNITED STATES PATENT OFFICE.

FRED A. NEIDER, OF AUGUSTA, KENTUCKY.

METHOD OF MAKING CARRIAGE-CURTAIN KNOBS.

SPECIFICATION forming part of Letters Patent No. 788,551, dated May 2, 1905.

Application filed December 4, 1902. Serial No. 133,871.

*To all whom it may concern:*

Be it known that I, FRED A. NEIDER, a citizen of the United States of America, and a resident of Augusta, county of Bracken, State of Kentucky, have invented a certain new and useful Method of Making Carriage-Curtain Knobs, of which the following is a specification.

The object of my invention is a means for inserting the shank into and securing the same firmly to the head of a curtain-knob, which involves few steps and secures the parts rigidly together.

In the accompanying drawings the successive steps of the operation embodying my invention are illustrated.

Figure 1 is a sectional view of a vise holding a blank, shown in elevation, above which a swage in the act of descending is shown in section. Fig. 2 is a similar view showing the position and the shape of the blank after the swage has descended. Fig. 3 is a sectional view of the blank seated in a block, showing a drill receding from the same after having drilled a hole therein for the reception of the shank. Fig. 4 is a similar view showing the means of forcing the metal about the shank to hold the same in the head. Fig. 5 is an elevation of the completed knob.

Referring to the parts, a blank A, formed from a short piece of wire, which has had a head $a$ formed thereon in a heading-machine, is inserted between the jaws B B' of a vise. A swage C, having in its contacting face a cavity $c$, and within the cavity a small projecting pin-point $c'$, is then forced down upon the end of the blank, forming thereon a collar $a'$ of a circumference equal to that of head $a$ and a nipple $a^2$, the latter having a small central indentation $a^3$. Indentation $a^3$ forms a seat for drill D, which then drills a longitudinal central hole $a^4$ in the blank, which is then seated in a plate M, having a hole $m$ of the size of the circumference of the collar and head of blank A. Shank E of the carriage-curtain knob is then seated in the hole $a^4$, and a plunger F, having a central hole $f$ of a circumference such as to receive the shank E, is then brought down upon the blank. Shank E enters hole $f$, and the plunger flattens nipple $a^2$ down around the base of the shank, forcing the metal of the blank firmly about the shank and securing it rigidly in the head of the button.

What I claim is—

The process of forming a carriage-curtain knob, consisting of forming a blank, having a hole which is to receive the shank and a nipple surrounding the same, inserting the shank and forcing the metal in the nipple down around the base of the shank, substantially as set forth.

FRED A. NEIDER.

Witnesses:
WILL A. FIELD,
W. C. SADLER.